US006731109B2

(12) United States Patent
Johnson et al.

(10) Patent No.: US 6,731,109 B2
(45) Date of Patent: May 4, 2004

(54) MAGNETIC POSITION SENSOR HAVING A STEPPED MAGNET INTERFACE

(75) Inventors: Gary W. Johnson, Huntington, IN (US); Stanley J. Domanski, Huntington, IN (US)

(73) Assignee: Wabash Technologies, Inc., Huntington, IN (US)

( * ) Notice: Subject to any disclaimer, the term of this patent is extended or adjusted under 35 U.S.C. 154(b) by 0 days.

(21) Appl. No.: 10/194,810

(22) Filed: Jul. 12, 2002

(65) Prior Publication Data

US 2004/0008025 A1 Jan. 15, 2004

(51) Int. Cl.[7] .............................. G01B 7/00; G01B 7/14
(52) U.S. Cl. ............................ 324/207.2; 324/207.24
(58) Field of Search ................... 324/207.2, 207.21, 324/207.22, 207.24; 335/207, 306

(56) References Cited

U.S. PATENT DOCUMENTS

| 3,750,068 A | * | 7/1973 | Hallin .......................... 335/306 |
| 4,810,965 A | | 3/1989 | Fujiwara et al. ........ 324/207.22 |
| 4,859,941 A | * | 8/1989 | Higgs et al. .............. 324/207.2 |
| 5,045,785 A | | 9/1991 | Hansen ..................... 324/207.16 |
| 5,670,876 A | | 9/1997 | Dilger et al. ........... 324/207.13 |
| 5,793,201 A | | 8/1998 | Nelle et al. ............. 324/207.14 |
| 5,858,531 A | | 1/1999 | Chenite et al. .............. 428/402 |
| 5,955,881 A | | 9/1999 | White et al. .............. 324/207.2 |
| 6,057,682 A | | 5/2000 | McCurley et al. ...... 324/207.23 |
| 6,175,233 B1 | | 1/2001 | McCurley et al. ....... 324/207.2 |
| 6,211,688 B1 | | 4/2001 | Vallet ......................... 324/758 |
| 6,215,299 B1 | | 4/2001 | Reynolds et al. ........ 324/207.2 |
| 6,222,359 B1 | | 4/2001 | Duesler et al. ........ 324/207.12 |
| 6,304,078 B1 | | 10/2001 | Jarrad et al. ............ 324/207.2 |
| 6,316,936 B1 | | 11/2001 | Striker et al. .......... 324/207.21 |
| 6,323,641 B1 | * | 11/2001 | Allwine ................... 324/207.2 |
| 6,586,929 B1 | * | 7/2003 | Luetzow ................. 324/207.24 |
| 2001/0026154 A1 | | 10/2001 | Nekado ................. 324/207.17 |
| 2001/0035749 A1 | | 11/2001 | Nekado ................. 324/207.15 |
| 2001/0038281 A1 | | 11/2001 | Nyce et al. ............ 324/207.13 |

FOREIGN PATENT DOCUMENTS

RU      480088      * 11/1975

* cited by examiner

*Primary Examiner*—Gerard R. Strecker
(74) *Attorney, Agent, or Firm*—Woodard, Emhardt, Moriarty, McNett & Henry LLP (57) ABSTRACT

A non-contacting magnetic position sensor that produces a magnetic field having improved linear characteristics over an extended sensing range. The magnetic position sensor includes a pair of magnets, a pair of pole pieces extending between the magnets and spaced apart to define an air gap, and a magnetic flux sensor operable to sense varying magnitudes of magnetic flux density along the length of the air gap. The pole piece segments form a stepped interface with each of the magnets and cooperate with the magnets to provide a magnetic field having a magnetic flux density that varies in a substantially linear manner along substantially the entire length of the air gap. The magnetic flux sensor is positioned within the magnetic field and is operable to sense a magnitude of the varying magnetic flux density along the air gap and to provide an output signal representative of a position of the magnetic flux sensor relative to the magnetic field.

33 Claims, 5 Drawing Sheets

MAGNETIC POSITION SENSOR HAVING A STEPPED MAGNET INTERFACE

FIELD OF THE INVENTION

The present invention generally relates to the field of magnetic sensors for sensing the position of a structure over a predetermined sensing range, and more specifically relates to a non-contacting magnetic position sensor having a stepped magnet interface that provides a magnetic field having improved linear characteristics over an extended sensing range.

BACKGROUND OF THE INVENTION

Magnetic position sensors are devices that generate an electronic signal output that is indicative of the relative position of a mechanical component, such as, for example, a control shaft or rotor in the case of a rotational position sensor or a carrier mechanism or linkage in the case of a linear position sensor. Certain types of magnetic position sensors generate an electronic signal output representative of the relative position of the mechanical component without actual physical contact with the mechanical component. These types of non-contacting magnetic position sensors include a magnetic circuit that is operably coupled to the mechanical component and which is configured to produce a magnetic field having a magnetic field strength that varies along an air gap. A magnetic sensing element is positioned within the air gap and is operable to sense variations in the magnitude of the magnetic field strength in response to relative displacement between the magnetic field and the sensing element. The magnitude of the magnetic field strength is translated through the sensing element and is converted to a voltage or current output signal that is uniquely representative of the relative position of the mechanical component.

Figure 1:
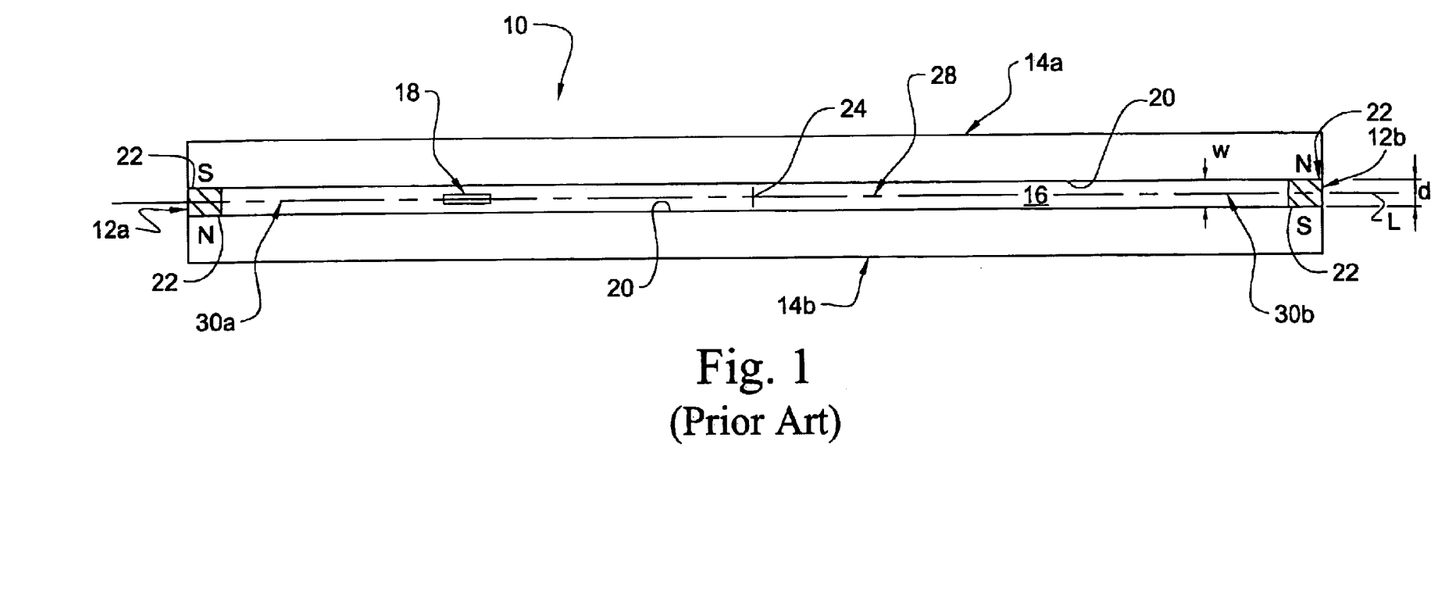
FIG. 1 is a top plan view of a prior art magnetic position sensor.

Referring to FIG. 1, shown therein is one example of a prior art magnetic position sensor 10. The magnetic position sensor 10 includes a pair of permanent magnets 12a, 12b and a pair of magnetically permeable plates 14a, 14b extending between the magnets 12a, 12b and spaced apart to define an air gap 16 therebetween. The magnets 12a, 12b and the plates 14a, 14b cooperate to form a closed magnetic circuit that produces a magnetic field having a magnetic field strength that varies along the length of the air gap 16. A magnetic sensing element 18 is positioned within the air gap 16 and is operable to sense variations in magnetic field strength as the sensing element 18 is relatively displaced along the air gap 16. Notably, the magnetically permeable plates 14a, 14b are rectangular-shaped, each defining a flat, uninterrupted inner surface 20 that is operably attached to a corresponding flat magnetic pole surface 22 defined by each of the magnets 12a, 12b. As a result, the width w of the air gap 16 is equal to the distance d between the pole surfaces 22 of the magnets 12a, 12b.

The sensing element 18 is physically capable of being displaced along virtually the entire length of the air gap 16. When positioned at the approximate midpoint 24 of the air gap 16, the magnitude of the magnetic flux density passing through the sensing element 18 is at or near zero. As the sensing element 18 is relatively displaced on either side of the midpoint 24, the absolute value of the magnetic flux density increases in a manner proportional to the distance from the midpoint 24. However, since the magnetic field flows in opposite directions on either side of the midpoint 24, the actual value of the magnetic flux density on one side of the midpoint 24 is interpreted as being positive while the actual value of the magnetic flux density on the other side of the midpoint 24 is interpreted as being negative.

Figure 2:
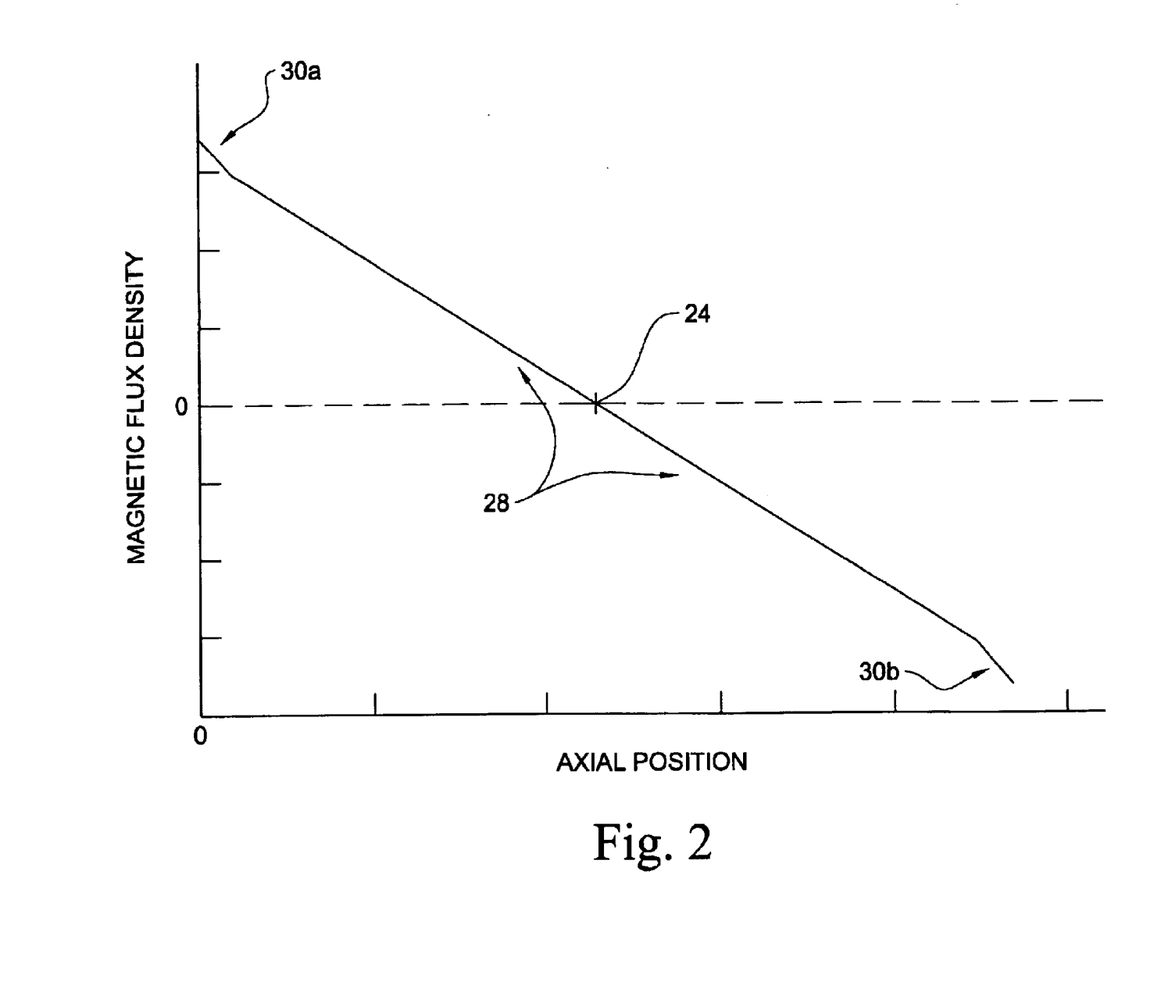
FIG. 2 is a graph depicting magnetic flux density along a sensing path of the prior art magnetic position sensor illustrated in FIG. 1 as a function of axial position along the sensing path.

As shown in FIG. 2, the magnitude of the magnetic flux density varies in a substantially linear manner along the mid-portion 28 of the air gap 16 on either side of the midpoint 24. However, as the relative position of the sensing element 18 approaches the end portion 30a of the air gap 16 adjacent the magnet 12a and the end portion 30b of the air gap 16 adjacent the magnet 12b, the change in magnitude of the magnetic flux density significantly deviates from that experienced along the mid-portion 28 of the air gap 16. This phenomenon at least partially results from the tendency of the magnetic flux to leak from the interfaces between the inner plate surface 20 and the magnetic pole surface 22, thereby resulting in an increased concentration of the magnetic flux density field strength in the areas adjacent the magnets 12a, 12b. This non-linearity in the magnitude of the magnetic flux density field strength adjacent the magnets 12a, 12b reduces the overall sensing range of the magnetic position sensor 10. Although an auxiliary electronic circuit may be used to compensate for these non-linear characteristics, post processing of the sensor output signal typically results in increased sensor costs and a possible decrease in sensor accuracy and reliability.

Thus, there is a general need in the industry to provide a magnetic position sensor having improved linear characteristics over an extended sensing range. The present invention satisfies this need and provides other benefits and advantages in a novel and unobvious manner.

SUMMARY OF THE INVENTION

The present invention is directed to a magnetic position sensor having a stepped magnet interface that provides a magnetic field having improved linear characteristics over an extended sensing range. While the actual nature of the invention covered herein can only be determined with reference to the claims appended hereto, certain forms of the invention that are characteristic of the preferred embodiments disclosed herein are described briefly as follows. However, it should be understood that other embodiments are also contemplated as falling within the scope of the present invention.

In one form of the present invention, a magnetic position sensor is provided which includes a magnet, a pair of pole piece segments spaced apart to define an air gap, and a magnetic flux sensor. The pole piece segments form a stepped interface with the magnet to provide a magnetic field within the air gap having a varying magnetic flux density. The magnetic flux sensor is positioned within the magnetic field and is operable to sense a magnitude of the varying magnetic flux density along the air gap and to provide an output signal representative of a position of the magnetic flux sensor relative to the magnetic field.

In another form of the present invention, a magnetic position sensor is provided which includes first and second magnets, first and second pole pieces extending between the magnets and spaced apart to define an air gap, and a magnetic flux sensor. The first and second pole pieces form a stepped interface with the magnets to form a closed magnetic circuit that provides a magnetic field within the air gap having a varying magnetic flux density. The magnetic flux sensor is positioned within the magnetic field and is operable to sense a magnitude of the varying magnetic flux density along the air gap and to provide an output signal representative of a position of the magnetic flux sensor relative to the magnetic field.

In yet another form of the present invention, a magnetic position sensor is provided which includes a magnet, a pair of pole piece segments spaced apart to define an air gap, and a magnetic flux sensor. The magnet has a first pole surface, a second pole surface, and side surfaces extending between the first and second pole surfaces. The pole piece segments each include a first portion positioned adjacent a respective one of the first and second pole surfaces of the magnet, and a second portion positioned adjacent one of the side surfaces of the magnet. The magnet and the pole piece segments cooperate to provide a magnetic field within the air gap having a varying magnetic flux density. The magnetic flux sensor is positioned within the magnetic field and is operable to sense a magnitude of the varying magnetic flux density along the air gap and to provide an output signal representative of a position of the magnetic flux sensor relative to the magnetic field.

In still another form of the present invention, a magnetic position sensor is provided which includes means for generating a magnetic field, means for providing the magnetic field with a varying magnetic flux density along an axis with the means for providing forming a stepped interface with the means for generating, and means for sensing a magnitude of the varying magnetic flux density along the axis and for generating an output signal representative of a position of the means for sensing relative to the magnetic field.

It is one object of the present invention to provide an improved magnetic position sensor having a stepped magnet interface that provides a magnetic field having improved linear characteristics over an extended sensing range.

Further objects, features, advantages, benefits, and aspects of the present invention will become apparent from the drawings and description contained herein.

DESCRIPTION OF THE PREFERRED EMBODIMENTS

For the purposes of promoting an understanding of the principles of the present invention, reference will now be made to the preferred embodiments illustrated in the drawings and specific language will be used to describe the same. It will nevertheless be understood that no limitation on the scope of the present invention is intended, and any alterations or modifications in the disclosed embodiments and further applications of the principles of the present invention are contemplated as would normally occur to one skilled in the art to which the present invention relates.

Figure 3:
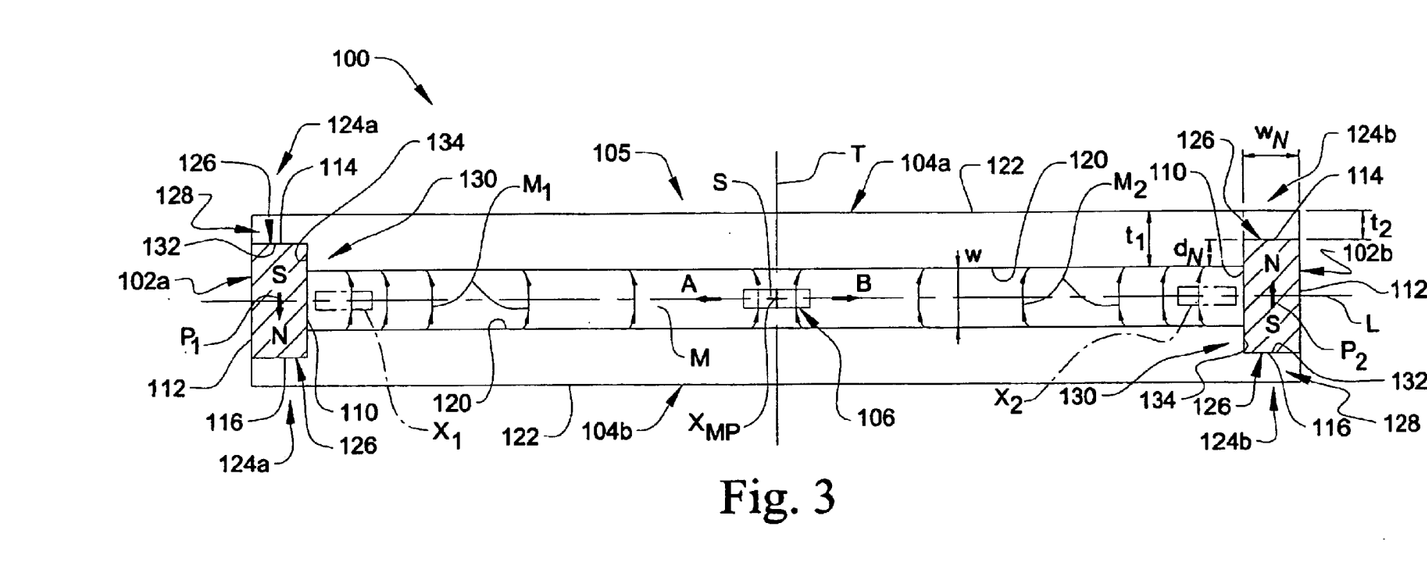
FIG. 3 is a top plan view of a magnetic position sensor according to one form of the present invention.
Figure 4:
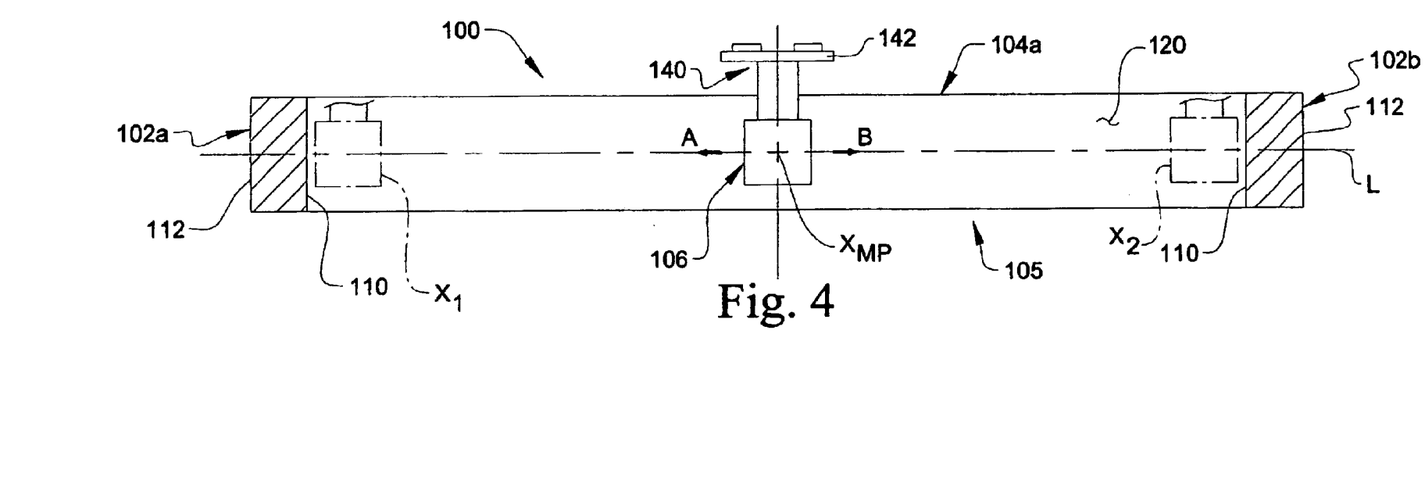
FIG. 4 is an elevational view, partially in cross-section, of the magnetic position sensor illustrated in FIG. 3.

Referring to FIGS. 3 and 4, shown therein is a magnetic position sensor 100 according to one form of the present invention. The magnetic position sensor 100 extends generally along a longitudinal axis L and includes a pair of magnets 102a, 102b cooperating with a pair of elongate pole pieces 104a, 104b to form a magnetic circuit 105 producing a magnetic field M. The magnetic position sensor 100 also includes a sensing device 106 operable to sense a magnitude of the magnetic flux density field strength generated by the magnetic circuit 105 and to generate an electronic output signal that is representative of the sensed magnitude of magnetic flux density.

The elongate pole pieces 104a, 104b extend between the magnets 102a, 102b and are spaced apart to define an air gap G extending generally along the longitudinal axis L. The magnets 102a, 102b and the elongate pole pieces 104a, 104b cooperate with one another to provide a magnetic field M flowing across the air gap G in directions substantially parallel with a transverse axis T. The magnetic field M has a magnetic flux density field strength that varies along the length of the air gap G in the direction of the longitudinal axis L. As will be discussed in further detail below, the magnetic field M preferably has a magnetic flux density field strength that varies along the length of the air gap G in a substantially linear manner. The sensing device 106 is positioned within the magnetic field M and senses variations in the magnitude of the magnetic flux density field strength as the sensing device 106 is displaced relative to the magnetic field M. The sensing device 106 in turn generates an output signal uniquely representative of the axial position of the sensing device 106 relative to the magnetic field M.

Although the magnetic position sensor 100 illustrated and described herein is configured as a linear position sensor (e.g., a sensor having a sensing path extending along a linear axis), it should be understood that the magnetic position sensor 100 could alternatively be configured for use in other applications as well, such as, for example, a rotary position sensor (e.g., a sensor having a sensing path extending along a circular or arcuate axis). Additionally, although not specifically illustrated and described herein, it should be understood that the magnetic position sensor 100 may be enclosed within a sensor housing to protect the magnetic circuit from the surrounding environment, to shield the magnetic circuit from stray magnetic fields and/or to provide a means for mounting the position sensor 100 to a suitable structure or substrate. Details regarding the inclusion of a sensor housing would be apparent to one skilled in the art and therefore need not be specifically discussed herein.

In a preferred embodiment of the present invention, the magnets 102a, 102b are rare earth magnets having a generally rectangular configuration. This particular type and shape of magnet is relatively common, thereby increasing sourcing opportunities and reducing the overall cost of the magnetic position sensor 100. In a specific embodiment of the invention, the rare earth magnets 102a, 102b are injection molded and are substantially void of any magnetic flux density hot spots. However, it should be understood that other types of magnets having different operational characteristics, material compositions and/or methods of manufacture are also contemplated as would occur to one of skill in the art. For example, electromagnets may alternatively be used as a means to generate a magnetic field, the details of which would be apparent to one of skill in the art. Additionally, it should be understood that other shapes and/or configurations of magnets are also contemplated as would occur to one of ordinary skill in the art, including magnets having an irregular or non-rectangular configuration, such as, for example, an arcuate shape or a polygonal shape.

The magnets 102a, 102b preferably have a substantially identical shape and configuration. Therefore, like features of the magnets 102a, 102b will be referred to using the same reference numerals. In a preferred embodiment of the invention, the magnets 102a, 102b each include a pair of oppositely-facing side surfaces 110, 112 aligned generally parallel with the transverse axis T, and a pair of oppositely-facing end surfaces 114, 116 aligned generally parallel with the longitudinal axis L. However, as discussed above, it should be understood that other shapes and/or configurations of the magnets 102a, 102b are also contemplated as falling within the scope of the present invention.

In one embodiment of the invention, the end surfaces 114, 116 of the magnets 102a, 102b are magnetic pole surfaces of opposite polarity, thereby polarizing each of the magnets 102a, 102b in a direction substantially parallel with the transverse axis T. In the illustrated embodiment, the end surfaces 114, 116 of the magnet 102a are south and north pole surfaces, respectively, and the end surfaces 114, 116 of the magnet 102b are north and south pole surfaces, respectively. As a result, the magnet 102a is polarized in a polarization direction $P_1$, while the magnet 102b is polarized in an opposite polarization direction $P_2$. In one embodiment of the invention, the polarization directions $P_1$ and $P_2$ are arranged substantially perpendicular to the longitudinal axis L. It should be understood, however, that other magnetic polarization arrangements are also contemplated as falling within the scope of the present invention.

In one embodiment of the invention, the elongate pole pieces 104a, 104b are formed of a magnetically permeable material, such as, for example, iron or cold rolled steel (hereafter "CRS"). However, it should be understood that other magnetically permeable materials are also contemplated as falling within the scope of the present invention. For example, in an alternative embodiment of the invention, the pole pieces 104a, 104b may be at least partially formed of a material having a magnetic reluctance different from the magnetic reluctance of iron or CRS. In one embodiment, the pole pieces 104a, 104b may be at least partially formed of a ferrite material. In another embodiment, the pole pieces 104a, 104b may be at least partially formed of a plastic or polymer material, such as, for example, a nylon material. In yet another embodiment, the pole pieces 104a, 104b may be formed of a composite material comprised of a non-magnetic material and a magnetizable filler material, such as, for example Nylon 6/6. Further details regarding the use of such alternative materials to form the elongate pole pieces 104a, 104b may be found in U.S. Provisional Patent Application No. 60/340,571 to Luetzow, the contents of which are hereby incorporated by reference in their entirety.

The elongate pole pieces 104a, 104b preferably have a substantially identical shape and configuration. Therefore, like features of the elongate pole pieces 104a, 104b will be referred to using the same reference numerals. In a preferred embodiment of the invention, the elongate pole pieces 104a, 104b have a substantially linear, plate-like configuration. However, it should be understood that the pole pieces 104a, 104b may take on a non-linear configuration, such as, for example, a circular or curvilinear configuration, to accommodate applications involving rotary sensor designs. Each of the elongate pole pieces 104a, 104b includes an inwardly facing axial surface 120 and an outwardly facing axial surface 122, with the inwardly facing surfaces 120 of the elongate pole pieces 104a, 104b spaced apart to define the air gap G therebetween. The elongate pole pieces 104a, 104b are preferably arranged in a substantially parallel relationship relative to one another and are preferably arranged in a substantially symmetrical relationship relative to the longitudinal axis L so as to define an air gap G having a generally uniform air gap width w. However, it should be understood that the elongate pole pieces 104a, 104b may be configured and/or arranged so as to define an air gap G having an air gap width w that varies along the longitudinal axis L.

In a preferred embodiment of the invention, the elongate pole pieces 104a, 104b form a stepped interface with each of the magnets 102a, 102b, the purpose of which will be discussed in detail below. The elongate pole pieces 104a, 104b include opposite end portion 124a, 124b, with each of the end portion 124a, 124b having a stepped region 126 configured to interface with the magnets 102a, 102b, respectively. In one embodiment of the invention, the stepped region 126 comprises a recessed or notched area sized and shaped to receive a corresponding portion of a respective magnet 102a, 102b therein to thereby form a stepped interface between the pole pieces 104a, 104b and each of the magnets 102a, 102b.

In one embodiment of the invention, each of the notched areas of the pole pieces 104a, 104b are defined by an axial portion 128 and a shoulder portion 130. The axial portion 128 includes a recessed axial surface 132 outwardly offset relative to the inner axial surface 120. The shoulder portion 130 includes an inner transverse surface 134 extending between the axial surfaces 120, 132. In one embodiment of the invention, the recessed axial surface 132 is arranged substantially perpendicular to the transverse shoulder surface 134 so as to define a rectangular-shaped cut out adapted to receive a corresponding corner portion of a respective magnet 102a, 102b therein. Although a specific embodiment of the stepped region 126 of the elongate pole pieces 104a, 104b has been illustrated and described herein, it should be understood that other shapes and configurations of the stepped region 126 are also contemplated as falling within the scope of the present invention.

As illustrated in FIG. 3, the stepped regions 126 of the elongate pole pieces 104a, 104b form stepped interfaces with each of the magnets 102a, 102b. In one embodiment of the invention, the axial portion 128 of the stepped region 126 is positioned adjacent an end portion of a respective magnet 102a, 102b, while the shoulder portion 130 is positioned adjacent a side portion of a respective magnet 102a, 102b. In a more specific embodiment, the recessed axial surface 132 is engaged against one of the pole surfaces 114, 116 of the magnets 102a, 102b, while the shoulder surface 134 is engaged against the inwardly facing side surface 110 of the magnets 102a, 102b. Inclusion of the stepped interface between the elongate pole pieces 104a, 104b and the magnets 102a, 102b results in an air gap width w that is less than the distance separating the pole surfaces 114, 116 of the magnets 102a, 102b.

In one embodiment of the invention, the axial portion 128 of the pole pieces 104a, 104b extends substantially the entire length of the corresponding pole surface 114, 116. Stated another way, the notched area defined by the stepped region 126 has a notch width $w_n$ approximately equal to the width of the pole surface 114, 116. It should be understood, however, that other notch widths $w_n$ are also contemplated as falling within the scope of the present invention. In another embodiment of the invention, each of the pole pieces 104a, 104b has an overall plate thickness $t_1$, with the axial portion 128 having a reduced thickness $t_2$. In a specific embodiment of the invention, the overall plate thickness $t_1$ is approximately twice that of the reduced thickness $t_2$. Stated another way, the notched area defined by the stepped region 126 has a notch depth $d_1$ approximately equal to one-half of the overall plate thickness $t_1$. It should be understood, however, that other notch depths $d_n$ are also contemplated as falling within the scope of the present invention.

The pole pieces 104a, 104b are preferably adjoined to the magnets 102a, 102b to substantially prevent relative movement therebetween, which in turn eliminates or at least minimizes sensor error and/or magnetic hysteresis. For purposes of the present invention, the term "adjoined" is broadly defined as a unitary fabrication, a permanent affixation, a detachable coupling, a continuous engagement or a contiguous disposal of a first structure relative to a second structure. In one embodiment, adjoinment of the pole pieces 104a, 104b to the magnets 102a, 102b is accomplished via bonding, such as, for example, by way of an adhesive or a plastic bond. However, other methods of adjoinment are also contemplated, such as, for example, welding, fastening or any other method of attachment that would occur to one of skill in the art.

As discussed above, the magnets 102a, 102b and the elongate pole pieces 104a, 104b cooperate to form a magnetic circuit 105 that produces a magnetic field M having a magnetic flux density field strength that preferably varies in a substantially linear manner along the length of the air gap G. In one embodiment of the invention, the magnitude of the magnetic flux density field strength is at a maximum adjacent the inner side surfaces 110 of the magnets 102a, 102b, and gradually decreases in a substantially linear manner toward the midpoint of the air gap G (i.e., at the intersection of the longitudinal axis L and the transverse axis T). It should be appreciated that the magnitude of the magnetic flux density field strength is inversely proportional to the axial distance from the inner side surfaces 110 of the magnets 102a, 102b. In a preferred embodiment of the invention, the magnitude of the magnetic flux density field strength adjacent the midpoint of the air gap G is at or near zero. As discussed above, the polarization directions $P_1$, $P_2$ of the magnets 102a, 102b extend in opposite directions. As a result, the magnet 102a and the pole pieces 104a, 104b cooperate to form a first portion $M_1$ of the magnetic field M flowing transversely across the air gap G in a direction opposite the polarization direction $P_1$. Similarly, the magnet 102b and the pole pieces 104a, 104b cooperate to form a second portion $M_2$ of the magnetic field M flowing transversely across the air gap G in a direction opposite the polarization direction $P_2$.

The magnetic flux sensor 106 is positioned within the air gap G and is operable to sense varying magnitudes of magnetic flux density associated with each of the first and second portions $M_1$, $M_2$ of the magnetic field M. For purposes of the present invention, a "magnetic flux sensor" is broadly defined as any device that is capable of sensing magnetic flux density and generating at least one output signal that is representative of the sensed magnitude of the magnetic flux density. In one embodiment of the invention, the magnetic flux sensor 106 is a Hall-effect device that is capable of sensing magnetic flux density passing perpendicularly through a sensing plane S. In a preferred embodiment of the invention, the magnetic flux sensor 106 is arranged such that the sensing plane S is maintained in a relatively constant orientation relative to the inner axial surfaces 120 of the pole pieces 104a, 104b. The sensing plane S is preferably arranged parallel with the inner axial surfaces 120 of the pole pieces 104a, 104b; however, other orientations of the magnetic flux sensor 106 are also contemplated as falling within the scope of the present invention. In one embodiment of the invention, the Hall-effect device 106 is operably connected to a carrier mechanism 140 (FIG. 3). The carrier mechanism 140 includes an integral printed circuit board 142 containing the electronic circuitry associated with the Hall-effect device 106. Preferably, the electronic circuitry of the Hall-effect device 106 is integrated on a silicon chip using CMOS technology. It should be understood, however, that other types and configurations of carrier mechanisms are also contemplated for use in association with the Hall-effect device 106.

The functionality of a Hall-effect device is based on the physical principle that a voltage is generated transverse to the current flow direction in an electric conductor if a magnetic field is applied perpendicularly to the conductor. Typically, a Hall element is a small platelet that is formed of a semi-conductive material. In operation, the Hall element detects the magnitude of magnetic flux density passing through the Hall plate in a direction perpendicular to the surface of the Hall plate, and generates an output signal that is representative of the sensed magnitude of magnetic flux density. Preferably, the output signal is a voltage signal; however, other types of electronic output signals are also possible. Further details regarding the characteristics and operation of magnetic flux sensors, and particularly a Hall-effect type magnetic flux sensor, are disclosed in U.S. Pat. No. 6,137,288 to Luetzow the contents of which are incorporated herein in their entirety.

One type of Hall-effect device suitable for use with the present invention is a programmable Hall-effect device manufactured by Micronas under Part No. HAL-805. Another suitable non-programmable Hall-effect device is manufactured by Ashai Kasei Electronics Co., Ltd. under Part No. HZ-302C (SIP type). It should be understood, however, that other types and configurations of Hall-effect devices are also contemplated as would occur to one of skill in the art. It should also be understood that other types of magnetic flux sensors are also contemplated for use in association with the present invention, such as, for example, a magneto-resistive (MR) sensor or any other magnetic field-sensitive sensor device that would occur to one of skill in the art. Use of an MR-type magnetic flux sensor may be particularly advantageous in sensor applications where the thermal operating environment exceeds 160 degrees Celsius.

In operation, the Hall-effect device 106 senses varying magnitudes of magnetic flux density field strength associated with the magnetic field M as the Hall-effect device 106 is axially displaced relative to the magnetic field M. In one embodiment of the invention, the magnetic field M remains in a stationary position while the Hall-effect device 106 is displaced along longitudinal axis L. In another embodiment of the invention, the Hall-effect device 106 remains in a stationary position while the magnetic field M is displaced along the longitudinal axis L. In other embodiments of the invention, the Hall-effect device 106 and the magnetic field M may each be displaced along the longitudinal axis L, either at different rates and/or in opposite directions relative to one another. Mechanisms for providing such relative displacement between the Hall-effect device 106 and the magnetic field M are well known to those skilled in the art and therefore need not be discussed herein. Such mechanisms include, for example, various types of linkages, carriers, brackets, rotors and/or shafts.

Having described the various structural features associated with the magnetic position sensor 100, reference will now be made to the operation of the magnetic position sensor 100 according to one form of the present invention. Illustrated in FIGS. 3–4 are three operational positions of the Hall-effect device 106 relative to the magnetic circuit 105, indicated as operational positions $X_1$, $X_2$ and $X_{MP}$. When located at operational position $X_{MP}$, the Hall-effect device 106 is positioned at the approximate axial midpoint of the air gap G. When located at the operational positions $X_1$, $X_2$, the Hall-effect device 106 is positioned at the outermost points of the air gap G, proximately adjacent the magnets 102a, 102b.

Figure 5:
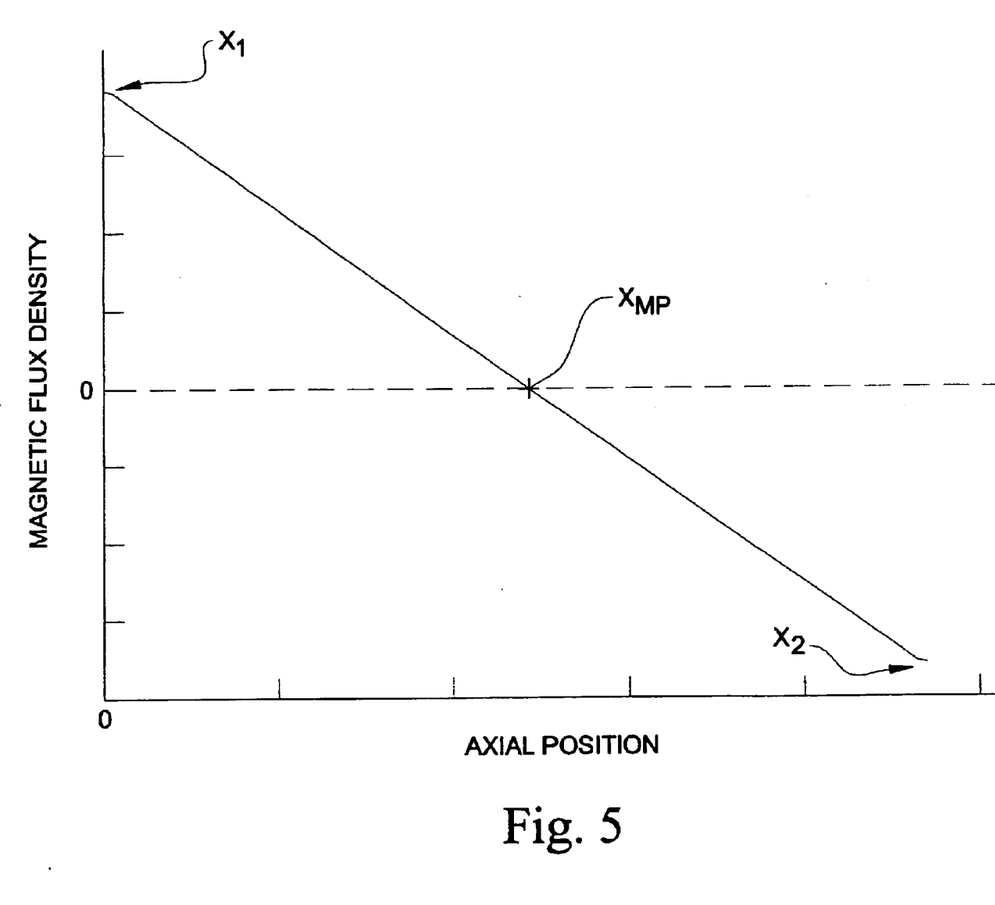
FIG. 5 is a graph depicting magnetic flux density along a sensing path of the magnetic position sensor illustrated in FIG. 3 as a function of axial position along the sensing path.

Referring to FIG. 5, shown therein is a graph depicting the varying magnitude of magnetic flux density along the length of the air gap G. When the Hall-effect device 106 is located at operational position $X_{MP}$, the magnitude of the magnetic flux density passing through the sensing plane S will be at its minimum, which is preferably at or near zero. However, as the Hall-effect device 106 is relatively displaced along the air gap G in the direction of arrow A (toward the operational position $X_1$) and through the first portion $M_1$ of the magnetic field M, the magnitude of magnetic flux density passing through the sensing plane S correspondingly increases, preferably in a substantially linear manner. Similarly, as the Hall-effect device 106 is relatively displaced along the air gap G in the direction of arrow B (toward the operational position $X_2$) and through the second portion $M_2$ of the magnetic field M, the magnitude of magnetic flux density passing through the sensing plane S also correspondingly increases, preferably in a substantially linear manner. When located at the outermost operational positions $X_1$, $X_2$, the absolute magnitude of the magnetic flux density passing through the sensing plane S will be at a maximum. However, since the magnetic flux lines flow in opposite directions along the first and second portions $M_1$, $M_2$ of the magnetic field (FIG. 3), the actual magnitude of the magnetic flux density along the first portion $M_1$ of the magnetic field is interpreted as having a positive value, while the actual magnitude of the magnetic flux density along the second portion $M_2$ of the magnetic field is interpreted as having a negative value.

As illustrated in FIG. 5, the magnitude of the magnetic flux density field strength continues to vary in a substantially linear manner even as the Hall-effect device 106 approaches the outermost operational positions $X_1$, $X_2$ adjacent the magnets 102a, 102b. For purposes of comparison, as illustrated in FIG. 2, the prior art magnetic position sensor 10 fails to maintain a linear change in magnetic flux density field strength as the relative position of the sensing element 18 approaches the end portions 30a, 30b of the air gap 16 adjacent the magnets 12a, 12b. To the contrary, the change in magnitude of the magnetic flux density field adjacent the end portions 30a, 30b significantly deviates from that experienced along the mid-portion 28 of the air gap 16, thereby resulting in a significant reduction in the overall usable sensing range of the magnetic position sensor 10. As discussed above, although auxiliary electronic circuitry may be used to compensate for the non-linear characteristics of the magnetic field produced by the magnetic position sensor 10, post processing of the sensor output signal typically results in increased sensor costs and a possible decrease in sensor accuracy and reliability.

The improved linear characteristics associated with the magnetic position sensor 100 is primarily the result of the inclusion of the stepped interface formed between the elongate pole pieces 104a, 104b and the magnets 102a, 102b. More specifically, as discussed above and as illustrated in FIG. 3, the elongate pole pieces 104a, 104b include opposite end portion 124a, 124b having a stepped region 126 configured to interface with the magnets 102a, 102b, respectively. The stepped region 126 is defined by the axial portion 128 and the shoulder portion 130, with the axial portion 128 positioned adjacent one of the magnet's pole surfaces 114, 116 and with the shoulder portion 130 positioned adjacent the magnet's inwardly facing side surface 110. Formation of the stepped interface between the pole pieces 104a, 104b and the magnets 102a, 102b results in a local saturation of the magnetic field flowing through the stepped region 126 of the pole pieces 104a, 104b. This local saturation of the magnetic field tends to shift or draw the magnetic field away from the pole surfaces 114, 116 of the magnets 102a, 102b, thereby avoiding increased concentrations of magnetic flux density within the air gap G adjacent the magnets 102a, 102b. Moreover, positioning of the shoulder portion 130 adjacent the magnet's inwardly facing side surface 110 tends to inhibit leakage of magnetic flux between the magnetic pole surfaces 114, 116, which likewise avoids increased concentrations of magnetic flux density within the air gap G adjacent the magnets 102a, 102b.

As should now be appreciated inclusion of the stepped interface between the pole pieces 104a, 104b and the magnets 102a, 102b results in improved linear characteristics of the magnetic field M adjacent the outermost operational positions $X_1$, $X_2$ of the Hall-effect device 106. These improved linear characteristics extend the overall usable sensing range of the magnetic position sensor 100 in comparison to that of the prior art magnetic position sensor 10 illustrated in FIGS. 1–2.

Figure 6:
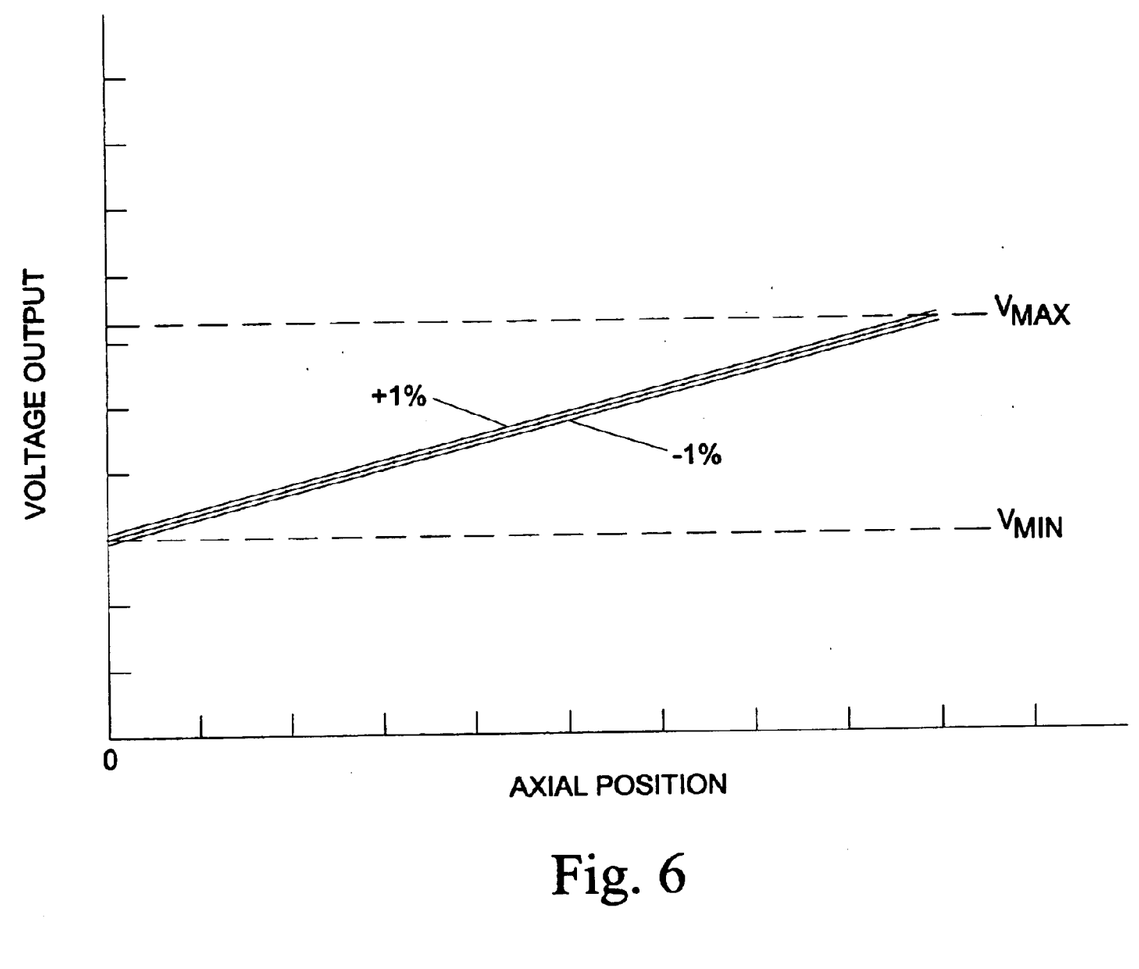
FIG. 6 is a graph depicting electronic signal output as a function of axial position along the sensing path of the magnetic position sensor illustrated in FIG. 3.

As discussed above, the Hall-effect device 106 functions to sense varying magnitudes of magnetic flux density in directions substantially perpendicular to the sensing plane S during displacement of the Hall-effect device 106 relative to the magnetic field M. The Hall-effect device 106 in turn generates an electronic signal, such as, for example, a voltage signal, that is proportional to the magnitude of the sensed magnetic flux density. Referring to FIG. 6, shown therein is a graph depicting the change in the electronic signal output generated by the Hall-effect device 106 as a function of the relative axial position of the Hall-effect device 106 along the air gap G. As illustrated in FIG. 6, the signal output of the Hall-effect device 106 varies in a substantially linear manner between a minimum voltage output signal $V_{MIN}$ and a maximum voltage output signal $V_{MAX}$ as the Hall-effect device 106 is axially displaced relative to the first and second portion $M_1$, $M_2$ of the magnetic field M. In a preferred embodiment of the invention, the signal output of the Hall-effect device 106 varies in a substantially linear manner between a minimum voltage output signal $V_{MIN}$ of about 1.5 Volts and a maximum voltage output signal $V_{MAX}$ of about 3.2 Volts. As also illustrated in FIG. 6, the voltage signal output of the Hall-effect device 106 preferably exhibits less than +/−1% deviation from a best-fit straight line.

Although specific levels and ranges of voltage signals have been disclosed herein, is should be understood that such values are for illustrative purposes only, and that other levels and ranges of voltage signals are also contemplated as falling within the scope of the present invention. It should also be understood that other types of signal output are also contemplated, such as, for example, a current signal output. It should additionally be understood that the voltage signal output may be passed through a programmable operational amplifier (not shown) to generate a final output voltage falling within a specified signal output range, the details of which would be known to those of skill in the art.

Although the illustrated embodiments of the present invention depict the use of a pair of magnets 102a, 102b cooperating with a pair of elongate pole pieces 104a, 104b to generate a magnetic field M, it should be understood that in other embodiments of the invention only one magnet need be used to generate a magnetic field having magnetic flux density that linearly varies along a length of an air gap. Moreover, although the illustrated embodiment of the present invention utilizes a single magnetic flux sensor 106 to sense variations in the magnetic flux density field strength, it should be understood that a plurality of magnetic flux sensors may be used to generate multiple signal outputs for applications requiring redundant signal outputs and/or multiple signal output profiles. Furthermore, although the magnetic position sensor of the present invention is illustrated as being sized to accommodate a specific sensing range along a travel axis, it should be understood that the magnetic circuit can easily be scaled up or scaled down to accommodate other sensing ranges and/or to satisfy the particular operational requirements of the magnetic sensor.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A magnetic position sensor, comprising:
   a magnet;
   a pair of pole piece segments spaced apart to define an air gap, each of said pole piece segments forming a stepped interface with said magnet to provide a magnetic field within said air gap having a varying magnetic flux density; and
   a magnetic flux sensor positioned within said magnetic field and operable to sense a magnitude of said varying magnetic flux density along said air gap and to provide an output signal representative of a position of said magnetic flux sensor relative to said magnetic field.

2. The magnetic position sensor of claim 1, wherein each of said pole piece segments includes a notched area sized and shaped to receive a corresponding portion of said magnet to form said stepped interface.

3. The magnetic position sensor of claim 2, wherein said notched area of said pole piece segments comprises a rectangular-shaped cut out; and
   wherein said corresponding portion of said magnet comprises a corner portion of said magnet.

4. The magnetic position sensor of claim 2, wherein each of said pole piece segments has a thickness; and
   wherein said notched area has a depth approximately equal to one-half of said thickness.

5. The magnetic position sensor of claim 1, wherein said magnet has a first pole surface, a second pole surface, and side surfaces extending between said first and second pole surfaces; and
   wherein each of said pole piece segments includes a first portion positioned adjacent a respective one of said first and second pole surfaces and a second portion positioned adjacent one of said side surfaces to thereby form said stepped interface with said magnet.

6. The magnetic position sensor of claim 5, wherein said first and second portions of said pole piece segments cooperate to define a rectangular-shaped cut out sized and shaped to receive a corresponding corner portion of said magnet therein to thereby form said stepped interface with said magnet.

7. The magnetic position sensor of claim 5, wherein said magnet has a substantially rectangular configuration.

8. The magnetic position sensor of claim 5, wherein said first portion of said pole piece segment defines a recessed surface and wherein said second portion of said pole piece segment defines a shoulder surface; and
   wherein said recessed surface is positioned in abutment against said respective one of said first and second pole surfaces; and
   wherein said shoulder surface is positioned in abutment against said one of said side surfaces.

9. The magnetic position sensor of claim 1, wherein said pole piece segments are formed of a material having a magnetic reluctance different from that of cold rolled steel.

10. The magnetic position sensor of claim 1, wherein said air gap extends along a first axis, said magnet being polarized along a second axis transverse to said first axis.

11. The magnetic position sensor of claim 10, wherein said first and second axes are arranged in a substantially perpendicular relationship relative to one another.

12. The magnetic position sensor of claim 10, wherein said first axis is substantially linear.

13. The magnetic position sensor of claim 1, wherein said magnetic flux sensor is a Hall-effect type sensor.

14. A magnetic position sensor, comprising:
    a first magnet;
    a second magnet;
    a first pole piece extending between said first and second magnets;
    a second pole piece extending between said first and second magnets and spaced from said first pole piece to define an air gap;
    said first and second pole pieces forming a stepped interface with each of said first and second magnets to form a magnetic circuit, said magnetic circuit providing a magnetic field within said air gap having a varying magnetic flux density; and
    a magnetic flux sensor positioned within said magnetic field and operable to sense a magnitude of said varying magnetic flux density along said air gap and to provide an output signal representative of a position of said magnetic flux sensor relative to said magnetic field.

15. The magnetic position sensor of claim 14, wherein said first and second magnets are polarized in opposite directions.

16. The magnetic position sensor of claim 14, wherein each of said first and second pole pieces includes opposite end portions, each of said end portions defining a notched area sized and shaped to receive a corresponding portion of a respective one of said magnets therein to form said stepped interface.

17. The magnetic position sensor of claim 14, wherein each of said magnets has a first pole surface, a second pole surface, and side surfaces extending between said first and second pole surfaces; and
    wherein each of said first and second pole pieces includes a pair of notched areas cooperating with corresponding ones of said first and second magnets to form said stepped interface, each of said notched areas including a first portion positioned adjacent one of said first and second pole surfaces and a second portion positioned adjacent one of said side surfaces to form said stepped interface.

18. The magnetic position sensor of claim 17, wherein each of said notched areas comprises a rectangular-shaped cut out sized and shaped to receive a corresponding corner portion of a respective one of said magnets therein to form said stepped interface.

19. A magnetic position sensor, comprising:

a magnet having a first pole surface, a second pole surface, and side surfaces extending between said first and second pole surfaces;

a pair of pole piece segments spaced apart to define an air gap and cooperating with said magnet to provide a magnetic field within said air gap having a varying magnetic flux density, each of said pole piece segments including a first portion positioned adjacent a respective one of said first and second pole surfaces of said magnet and a second portion positioned adjacent one of said side surfaces of said magnet; and a magnetic flux sensor positioned within said magnetic field and operable to sense a magnitude of said varying magnetic flux density along said air gap and to provide an output signal representative of a position of said magnetic flux sensor relative to said magnetic field.

20. The magnetic position sensor of claim 19, wherein each of said pole piece segments includes a notched area sized and shaped to receive a corresponding portion of said magnet to form said stepped interface.

21. The magnetic position sensor of claim 20, wherein said notch comprises a rectangular-shaped cut out.

22. The magnetic position sensor of claim 19, wherein said first portion of said pole piece segment defines a recessed surface and wherein said second portion of said pole piece segment defines a shoulder surface; and wherein said recessed surface is positioned in abutment against said respective one of said first and second pole surfaces; and wherein said shoulder surface is positioned in abutment against said one of said side surfaces.

23. The magnetic position sensor of claim 22, wherein said recessed surface and said shoulder surface are arranged in a substantially perpendicular relationship relative to one another so as to define a rectangular-shaped cut out.

24. The magnetic position sensor of claim 19, wherein each of said pole piece segments has an overall thickness; and wherein said first portion of said pole piece segments has a thickness approximately equal to one-half of said overall thickness.

25. The magnetic position sensor of claim 19, wherein said first portion of each of said pole piece segments extends substantially entirely along said respective one of said first and second pole surfaces of said magnet.

26. The magnetic position sensor of claim 19, wherein said pole piece segments are arranged in a substantially parallel relationship relative to one another.

27. The magnetic position sensor of claim 19, wherein said air gap extends along a first axis, said magnet being polarized along a second axis arranged transverse to said first axis.

28. The magnetic position sensor of claim 27, wherein said first and second axes are arranged in a substantially perpendicular relationship.

29. The magnetic position sensor of claim 19, wherein said magnet has a substantially rectangular configuration.

30. The magnetic position sensor of claim 19, wherein said pole piece segments are formed of a material having a magnetic reluctance different from that of cold rolled steel.

31. The magnetic position sensor of claim 1, wherein said magnetic flux density varies in a substantially linear manner along an end portion of said air gap adjacent said magnet.

32. The magnetic position sensor of claim 14, wherein said magnetic flux density varies in a substantially linear manner along end portions of said air gap adjacent said first and second magnets.

33. The magnetic position sensor of claim 19, wherein said magnetic flux density varies in a substantially linear manner along an end portion of said air gap adjacent said magnet.

* * * * *